United States Patent
Terada et al.

(10) Patent No.: US 10,752,970 B2
(45) Date of Patent: Aug. 25, 2020

(54) METHOD FOR PRODUCING TURBINE ROTOR AND METHOD FOR PRODUCING TURBINE

(71) Applicants: MITSUBISHI HEAVY INDUSTRIES COMPRESSOR CORPORATION, Tokyo (JP); JAPAN CASTING & FORGING CORPORATION, Fukuoka (JP)

(72) Inventors: Katsumi Terada, Hiroshima (JP); Takayuki Miyata, Kitakyushu (JP); Takafumi Higuchi, Onga-gun (JP); Hiroki Shibahara, Kitakyushu (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 170 days.

(21) Appl. No.: 15/737,688

(22) PCT Filed: Aug. 28, 2015

(86) PCT No.: PCT/JP2015/074527
§ 371 (c)(1),
(2) Date: Dec. 18, 2017

(87) PCT Pub. No.: WO2017/037804
PCT Pub. Date: Mar. 9, 2017

(65) Prior Publication Data
US 2018/0179608 A1 Jun. 28, 2018

(51) Int. Cl.
*C21D 9/00* (2006.01)
*F01D 5/02* (2006.01)
(Continued)

(52) U.S. Cl.
CPC .......... *C21D 9/0068* (2013.01); *B23P 15/04* (2013.01); *C21D 1/18* (2013.01); *C21D 1/58* (2013.01);
(Continued)

(58) Field of Classification Search
CPC .......... C21D 9/0068; C21D 1/18; C21D 1/58; C22C 38/02; C22C 38/04; C22C 38/44;
(Continued)

(56) References Cited

U.S. PATENT DOCUMENTS 5,108,699 A 4/1992 Bodnar et al.
5,383,768 A 1/1995 Siga et al.
(Continued)

FOREIGN PATENT DOCUMENTS

EP 0719869 A1 7/1996
EP 1091010 A1 4/2001
(Continued)

OTHER PUBLICATIONS

International Search Report for corresponding International Application No. PCT/JP2015/074527, dated Dec. 1, 2015 (4 pages).
(Continued)

*Primary Examiner* — Moshe Wilensky
(74) *Attorney, Agent, or Firm* — Osha Liang LLP

(57) ABSTRACT

A method for producing a turbine rotor includes forming a rotor base material having a maximum outer diameter of 1000 mm or less from low-alloy steel including carbon, silicon, manganese, nickel, chromium, molybdenum, and vanadium; heating the rotor base material, by a quenching process, to a temperature range of 940° C. to 960° C.; performing oil quenching on the rotor base material, after the quenching process, in a temperature range of 250° C. to 500° C., at a cooling rate of at least 2.0° C./min; and tempering the rotor base material, after the quenching pro-
(Continued)

cess, at a temperature of at least 630° C., and under a condition that a tempering parameter P is in the range of 19700 to 19900, wherein P is defined by the formula P=T (C+log(t)).

2 Claims, 2 Drawing Sheets

(51) Int. Cl.
| | |
|---|---|
| *F01D 5/28* | (2006.01) |
| *B23P 15/04* | (2006.01) |
| *C21D 1/18* | (2006.01) |
| *C21D 1/58* | (2006.01) |
| *C22C 38/02* | (2006.01) |
| *C22C 38/04* | (2006.01) |
| *C22C 38/44* | (2006.01) |
| *C22C 38/46* | (2006.01) |
| *F01D 5/06* | (2006.01) |

(52) U.S. Cl.
CPC .............. *C22C 38/02* (2013.01); *C22C 38/04* (2013.01); *C22C 38/44* (2013.01); *C22C 38/46* (2013.01); *F01D 5/02* (2013.01); *F01D 5/06* (2013.01); *F01D 5/286* (2013.01); *F05D 2220/31* (2013.01); *F05D 2230/40* (2013.01); *F05D 2230/60* (2013.01); *F05D 2240/12* (2013.01); *F05D 2240/14* (2013.01); *F05D 2240/24* (2013.01); *F05D 2300/171* (2013.01)

(58) Field of Classification Search
CPC . C22C 38/46; F01D 5/06; F01D 5/286; F01D 5/02; B23P 15/04
See application file for complete search history.

(56) References Cited

U.S. PATENT DOCUMENTS

| | | |
|---|---|---|
| 6,136,110 A | 10/2000 | Hashimoto et al. |
| 2003/0034101 A1 | 2/2003 | Kamada et al. |
| 2011/0017368 A1 | 1/2011 | Okamura et al. |
| 2012/0261038 A1 | 10/2012 | Ohsaki et al. |

FOREIGN PATENT DOCUMENTS

| | | |
|---|---|---|
| EP | 2514848 A1 | 10/2012 |
| JP | H11-502259 A | 2/1999 |
| JP | 2002-256378 A | 9/2002 |
| JP | 4071924 B2 | 4/2008 |
| JP | 2012-225222 A | 11/2012 |
| JP | 2013-155409 A | 8/2013 |
| WO | 2009/123227 A1 | 10/2009 |

OTHER PUBLICATIONS

Written Opinion for corresponding International Application No. PCT/JP2015/074527 dated Dec. 1, 2015 (9 pages).

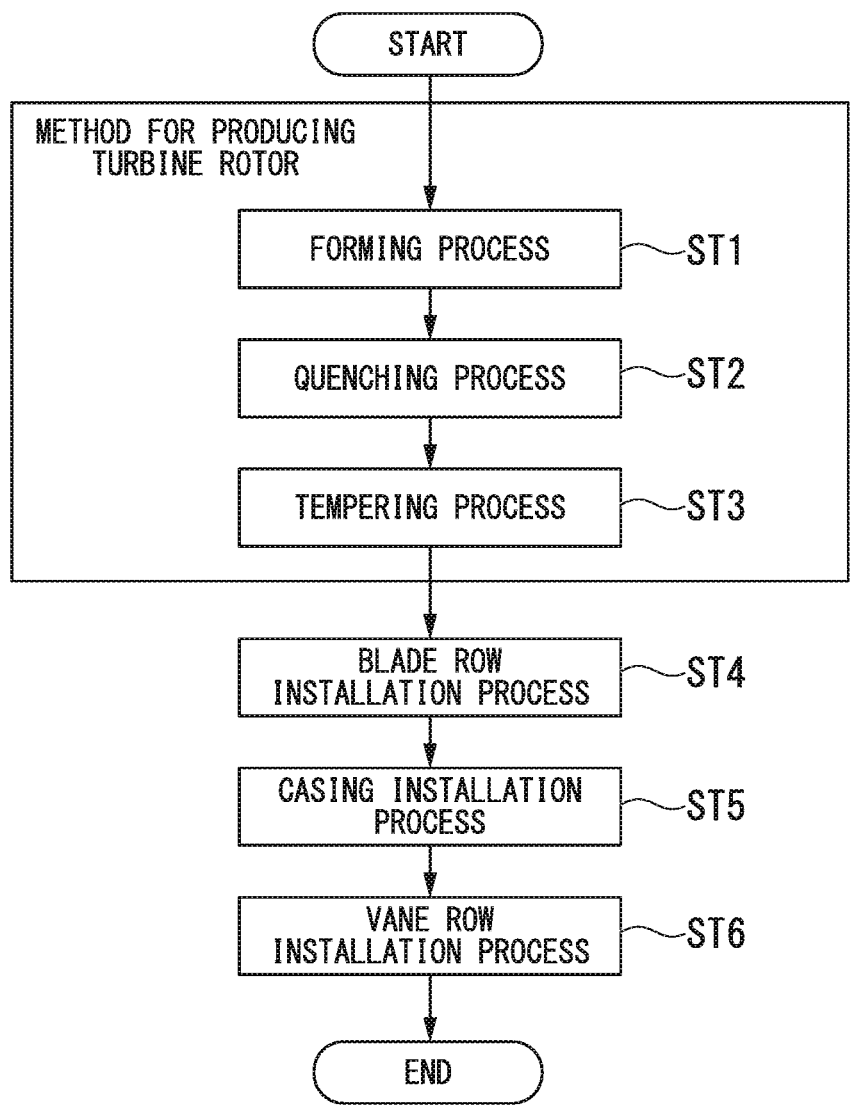

METHOD FOR PRODUCING TURBINE ROTOR AND METHOD FOR PRODUCING TURBINE

TECHNICAL FIELD

The present invention relates to a method for producing a turbine rotor and a method for producing a turbine.

BACKGROUND ART

In the related art, a steam turbine which extracts rotation energy from pressure energy of steam is known. A turbine rotor in the steam turbine is exposed to steam having a high temperature, and thus, the turbine rotor requires an improved high-temperature resistance. For example, Patent Document 1 discloses low-alloy heat resistant steel having an improved high-temperature resistance as a material used for a turbine rotor.

In the related art, in a large-sized steam turbine (condensate turbine), a large-sized turbine rotor having an outer diameter dimension exceeding 1000 mm is used. In the large-sized turbine rotor, in order to improve a high-temperature resistance, a method such as so-called gradient quenching (gradient heat treatment) is used.

By performing the gradient quenching, it is possible to produce a turbine rotor having high-temperature resistances required for a high-pressure portion and a low-pressure portion of a turbine for each portion of one turbine rotor.

PRIOR ART DOCUMENTS

Patent Document

Patent Document 1: Japanese Unexamined Patent Application, First Publication No. 2002-256378

Here, if a turbine rotor is produced using the gradient quenching as described above, a so-called transition region is formed between a region having a high-temperature resistance required for a high-pressure portion of a turbine and a region having a high-temperature resistance required for a low-pressure portion thereof, in which the transition region is an intermediate region having neither characteristic between them. However, if the gradient quenching is performed on a turbine rotor used in a small and medium-sized steam turbine, since the overall length of the turbine rotor is short, the entire turbine rotor becomes the transition region, and thus, the turbine rotor has characteristics which cannot satisfy any of requirements of the high-pressure portion and the low-pressure portion of the turbine. That is, even when the gradient quenching is adopted similarly to the large-sized turbine rotor of the related art, it is difficult to produce a small-sized turbine rotor having high-temperature resistance performance.

SUMMARY OF INVENTION

One or more embodiments of the present invention provide a method for producing a turbine rotor having a sufficient high-temperature resistance as a high and low pressure integral type turbine rotor used in a small and medium-sized turbine.

According to one or more embodiments of the present invention, there is provided a method for producing a turbine rotor, including: a forming process of forming a rotor base material having a maximum outer diameter of 1000 mm or less from low-alloy steel containing, in weight %, carbon of 0.20% to 0.35%, silicon of 0.35% or less, manganese of 1.00% or less, nickel of 0.50% to 1.50%, chromium of 2.00% to 2.50%, molybdenum of 0.90% to 1.50%, and vanadium of 0.20% to 0.30%; a quenching process of heating the rotor base material in a temperature range of 940° C. to 960° C. and thereafter, performing oil quenching on the rotor base material at least in a temperature range of 250° C. to 500° C. at a cooling rate of 2.0° C./min or more; and a tempering process of, following the quenching process, tempering the rotor base material in a temperature range of 630° C. or more and under a condition that a tempering parameter P defined by Expression P=T (C+log t) (where T is an absolute temperature (K), t is time (h), and C is a material constant) is 19700 to 19900.

According to one or more embodiments, the turbine rotor is produced by the above-described processes and thus, a turbine rotor having a maximum outer diameter dimension of 1000 mm or less used in a small and medium-sized turbine can have a sufficient high-temperature resistance. That is, even in the turbine rotor of the small and medium-sized turbine, sufficient high-temperature creep strength, low-temperature toughness, and SCC resistance (stress corrosion cracking resistance) can be obtained. As a result, a rotor disk (a portion to which a turbine blade is fixed) of the turbine rotor which is a high-pressure portion of the turbine can be thinned, and thus, it is possible to increase the number of turbine blade stages. In addition, a rotation load of the turbine rotor is decreased due to the thinning of the rotor disk, which leads to improvement in reliability. Moreover, due to improvement of the low-temperature toughness of the turbine rotor, a low-pressure portion of the turbine can cope with a high stress state. As a result, it is not necessary to take measures such as adjusting an operation temperature condition of the turbine required due to insufficient high-temperature resistance performance of the turbine rotor, and particularly, it is not necessary to decrease a temperature on a high-pressure side of the turbine, which leads to improvement of turbine efficiency.

According to one or more embodiments of the present invention, there is provided a method for producing a turbine, including: a blade row installation process of fixing a plurality of blade rows to a turbine rotor such that the plurality of blade rows are arranged in a direction of a rotation axis of the turbine rotor obtained by the method for producing the aforementioned turbine rotor according to one or more embodiments; a casing installation processing of providing a casing covering the turbine rotor such that the turbine rotor and the blade rows are rotatable relative to each other about the rotation axis; and a vane row installation process of fixing a plurality of vane rows to the casing such that each of the plurality of vane rows is disposed alternately with the blade rows in the direction of the rotation axis.

According to one or more embodiments of the method for producing a turbine, the turbine rotor is produced by one or more embodiments of the above-described producing method. Therefore, even in a turbine rotor of a small and medium-sized turbine, sufficient high-temperature creep strength, low-temperature toughness, and SCC resistance (stress corrosion cracking resistance) can be obtained. As a result, a rotor disk of the turbine rotor which is a high-pressure portion of the turbine can be thinned, and thus, it is possible to increase the number of turbine blade stages. In addition, a rotation load of the turbine rotor is decreased due to the thinning of the rotor disk, which leads to improvement in reliability. Moreover, due to improvement of the low-temperature toughness, a low-pressure portion of the turbine can cope with a high stress state.

According to one or more embodiments of the method for producing a turbine rotor and the method for producing turbine, it is possible to produce a turbine rotor having sufficient high-temperature resistance as a high and low pressure integral type turbine rotor used in a small and medium-sized turbine.

BRIEF DESCRIPTION OF THE DRAWINGS

FIG. 2 is a flowchart showing a procedure of a method for producing a steam turbine according to one or more embodiments of the present invention.

DETAILED DESCRIPTION OF EMBODIMENTS

Figure 1:
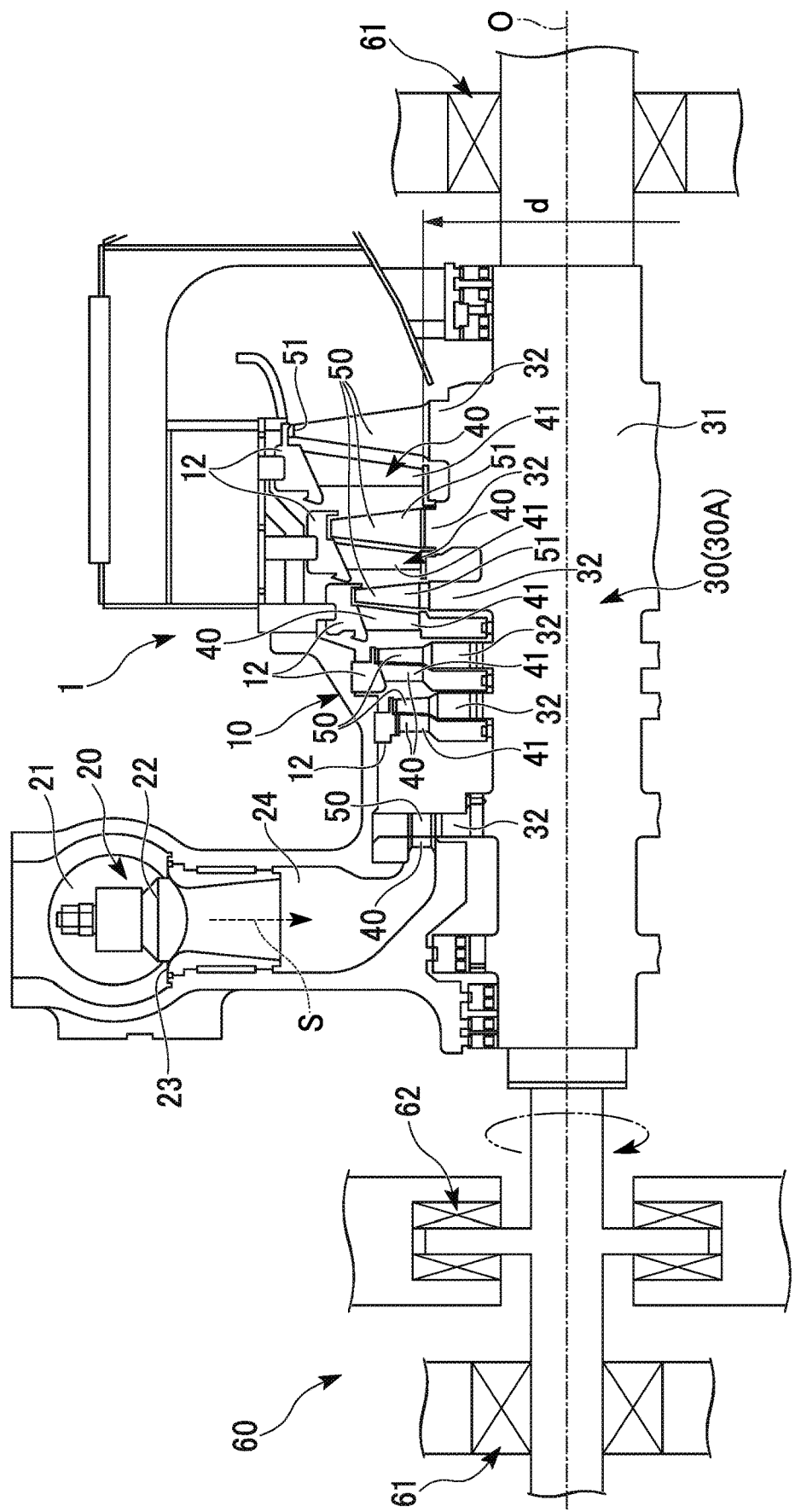
FIG. 1 is a schematic sectional view of a steam turbine according to one or more embodiments of the present invention.

First, a steam turbine 1, which is produced by a method for producing a turbine according to one or more embodiments of the present invention, will be described with reference to FIG. 1.

A steam turbine 1 includes a casing 10, an adjustment valve 20 which adjusts an amount and a pressure of steam S flowing into the casing 10, a turbine rotor 30 which is rotatably provided in an internal space inside the casing 10 and transmits power to a machine such as a generator (not shown), vane rows 40 which are fixed to the casing 10, blade rows 50 which are fixed to the turbine rotor 30, and a bearing portion 60 which rotatably supports the turbine rotor 30 around a rotation axis O.

The casing 10 is formed to airtightly seal the internal space and defines a flow path of the steam S.

A plurality of adjustment valves 20 are attached to the casing 10, and each of the adjustment valves 20 includes an adjustment valve chamber 21 into which the steam S from a boiler (not shown) flows, a valve body 22, a valve seat 23, and a steam chamber 24. In the adjustment valve 20, the valve body 22 is separated from the valve seat 23, a flow path of the steam S is open, and thus, the steam S flows into the internal space of the casing 10 via the steam chamber 24.

The turbine rotor 30 includes a rotor main body 31 and a plurality of disks 32 which extend radially outward from an outer periphery of the rotor main body 31. The turbine rotor 30 transmits rotation energy to the machine such as the generator (not shown).

The bearing portion 60 is fixed to the casing 10, includes a journal bearing device 61 and a thrust bearing device 62, and rotatably supports the turbine rotor 30 which is inserted to the inside of the casing 10.

A plurality of vane rows 40 are provided to be fixed to the casing 10 with an interval therebetween in the direction of the rotation axis O. Each vane row 40 includes a plurality of vanes 41 which are radially disposed to surround the turbine rotor 30 so as to configure an annular vane group.

In addition, each vane row 40 inverts pressure energy of the steam S into velocity energy and guides the velocity energy to a blade row 50 (described below) side adjacent to a downstream side in the direction of the rotation axis O.

A plurality of blade rows 50 are provided to be fixed to an outer periphery of the disk 32 in the turbine rotor 30 and extend radially outward from the turbine rotor 30. Each of the blade rows 50 includes a plurality of blades 51 which are radially disposed on the disk 32 to configure an annular blade group and is alternately disposed on the downstream side of each vane row 40.

Next, a method for producing the steam turbine 1 will be described with reference to FIG. 2.

First, a method for producing the turbine rotor 30 will be described.

That is, a forming process ST1 is performed. In the forming process ST1, a rotor base material 30A having a maximum outer diameter dimension of 1000 mm or less is formed from low-alloy steel containing, in weight %, carbon of 0.20% to 0.35%, silicon of 0.35% or less, manganese of 1.00% or less, nickel of 0.50% to 1.50%, chromium of 2.00% to 2.50%, molybdenum of 0.90% to 1.50%, vanadium of 0.20% to 0.30%, and the balance being iron and impurities (inevitably mixed during the production process), by forging. Here, the maximum outer diameter dimension of the rotor base material 30A indicates an outer diameter dimension d (refer to FIG. 1) of the disk 32 having a largest outer diameter among the plurality of disks 32.

Here, reasons for limiting chemical components of the rotor base material 30A will be described.

(1) Carbon: 0.20% to 0.35%

Carbon is an essential element for increasing the quenchability of steel. In order to obtain strength and toughness required for the turbine rotor 30, carbon of 0.20% or more is necessary. However, if carbon is too much, sufficient toughness cannot be obtained and workability deteriorates, and the content of carbon is set to 0.20% to 0.35%.

(2) Silicon: 0.35% or Less and Manganese: 1.00% or Less

Silicon and manganese are elements necessary for promoting deacidification of steel. If the content of silicon is too large, toughness and workability deteriorate, and thus, the content of silicon is set to 0.35% or less. Manganese increases quenchability and mechanical strength. However, if the content thereof is too large, since toughness decreases, the content of manganese is set to 1.00% or less.

(3) Nickel: 0.50% to 1.50%

Nickel is an element effective for improving quenchability and improving mechanical strength and toughness at a low temperature. However, the content thereof is too large, since strength decreases at a high temperature and temper embrittlement increases, the content of nickel is set to 0.50% to 1.50%.

(4) Chromium: 2.00% to 2.50%

Chromium is an element effective for improving strength and toughness at a high temperature. In addition, since chromium increases bainite quenchability, the content of chromium is set to 2.00% to 2.50% from the viewpoint of mass effect.

(5) Molybdenum: 0.90% to 1.50%

In coexistence of carbon and chromium, molybdenum has effects of increasing strength at a high temperature to relax temper embrittlement. In addition, since molybdenum increases bainite quenchability, molybdenum is also effective for improving toughness if an appropriate heat treatment is applied. However, if the content of molybdenum is too large, the above-described effects are saturated. Accordingly, in one or more embodiments, the content of molybdenum is set to 0.90% to 1.50%.

(6) Vanadium: 0.20% to 0.30%

Vanadium is the most effective element to increase strength at a high temperature. However, if the content of vanadium is too large, toughness decreases. Accordingly, in one or more embodiments, the content of vanadium is set to 0.20% to 0.30%.

Next, a quenching process ST2 is performed. That is, in the quenching process ST2, after the rotor base material 30A is heated in a temperature range of 940° C. to 960° C., oil quenching is performed on the rotor base material 30A at least in a temperature range of 250° C. to 500° C. at a cooling rate of 2.0° C./min or more.

In addition, a tempering process ST3 is performed. That is, in the tempering process ST3, the quenched rotor base material 30A is tempered in a temperature range of 630° C. or more and under a condition that a tempering parameter P is 19700 to 19900.

Here, the tempering parameter P is a numerical value defined by Expression or Formula (1) below.

$$P=T(C+\log t) \quad (1)$$

T is an absolute temperature (K), t is time (h), and C is a material constant. In addition, in one or more embodiments, the material constant C is set to 20.

In other words, the tempering process ST3 is performed so as to have predetermined 0.2% proof strength, tensile strength, elongation, contraction, impact value, and 50% FATT shown in Table 5 below in a temperature range of 630° C. or more.

The turbine rotor 30 is produced by the above-described processes.

In addition, a blade row installation process ST4 is performed in which the blade rows 50 are installed in the turbine rotor 30. In the blade row installation process ST4, the blades 51 are fixed to the disks 32 with an interval therebetween in the circumferential direction thereof. In addition, the blade rows 50 are provided with an interval therebetween in the direction of the rotation axis O so as to be arranged in the direction of the rotation axis O.

In addition, a casing installation process ST5 is performed, in which the turbine rotor 30 is supported by the bearing portion 60 and the bearing portion 60 and the turbine rotor 30 are fixed to the casing 10. Accordingly, in one or more embodiments, the casing 10 covers the turbine rotor 30 from the outer peripheral side, and the turbine rotor 30 and the blade rows 50 are rotatable relative to the casing 10 about the rotation axis O.

In addition, a vane row installation process ST6 is performed inside the casing 10, and thus, the plurality of vane rows 40 are fixed so as to be disposed alternately with the blade rows 50 in the direction of the rotation axis O. When each vane row 40 is fixed to the casing 10, the blades 51 are fixed with an interval therebetween in the circumferential direction.

For example, in the casing installation process ST5 and the vane row installation process ST6, a lower portion of the cracked casing 10 is installed, thereafter, the vane rows 40 are fixed to the lower portion of the casing 10. In this state, a turbine rotor 30 in which the blade rows 50 have been provided is incorporated in the lower portion of the casing 10. In addition, the vane rows 40 are fixed to the upper portion of the cracked casing 10, and the upper portion of the casing 10 is installed in the lower portion of the casing 10 in which the turbine rotor 30 is incorporated.

According to the method for producing a turbine of the above-described embodiments, the turbine rotor 30 having the maximum outer diameter dimension of 1000 mm or less used in the small and medium-sized steam turbine 1 can have a sufficient high-temperature resistance. That is, even in the turbine rotor 30 of the small and medium-sized steam turbine 1, sufficient high-temperature creep strength, low-temperature toughness, and SCC resistance (stress corrosion cracking resistance) can be obtained by the producing method of one or more embodiments.

Specifically, as described in Example below, in the high-temperature creep strength, LMP (Larson Miller Parameter) is 19.0 and σ≥206 [MPa] is satisfied.

In addition, in the low-temperature toughness, 50% FATT (Fracture Appearance Transition Temperature)<40[° C.] is satisfied.

As a result, in a high-pressure portion (a portion on a front stage side: the left portion on the paper surface of FIG. 1) of the steam turbine 1, the disk 32 of the turbine rotor 30 can be thinned, and thus, it is possible to increase the number of the blade rows. In addition, weight of the turbine rotor 30 is decreased due to the thinning of the disk 32, and thus, a rotation load of the turbine rotor 30 decreases, which leads to improvement in reliability.

In addition, due to improvement of the low-temperature toughness of the turbine rotor 30, a low-pressure portion (a portion on a rear stage side: the right portion on the paper surface of FIG. 1) of the steam turbine 1 can cope with a high stress state. As a result, it is not necessary to take measures such as adjusting an operation temperature condition of the steam turbine 1 required due to insufficient high-temperature resistance performance of the turbine rotor 30, and particularly, it is not necessary to decrease a temperature on a high-pressure side of the steam turbine 1, which leads to improvement of turbine efficiency.

Therefore, it is possible to produce the turbine rotor 30 having a sufficient high-temperature resistance as a high and low pressure integral type turbine rotor used in a small and medium-sized steam turbine 1.

Hereinbefore, various embodiments of the present invention are described in detail with reference to the drawings. However, the configurations of the embodiment and combinations thereof are merely example, and addition, omission, replacement, and other modifications of configurations can be applied within a scope which does not depart from the gist of the present invention. In addition, the present invention is not limited by the above-described embodiments, it is limited by only claims.

Example

A material test to check the high-temperature resistance of the turbine rotor 30 was performed as follows.

(Test Material)

As a test material, a test material block of 30 [mm]×30 [mm]×150 [mm] formed of the same material as the rotor base material 30A was prepared.

(Heat Treatment Simulation)

Heat treatment simulation was performed on the test material assuming rotor base materials 30A having outer diameters of φ500 [mm], φ1000 [mm], and φ1500 [mm].

In the heat treatment simulation, a heat treatment simulating a preliminary heat treatment and a refining heat treatment of a rotor material used in an actual machine was performed. In the heat treatment simulation, first, a solution treatment was performed. This solution treatment was performed to eliminate influences of the heat treatment carried out on a test piece. That is, after the test material was heated to 1200° C. and was held for one hour, air cooling was performed on the test material. Thereafter, a normalizing treatment and a tempering treatment equivalent to a preliminary heat treatment of the rotor used in the actual machine were performed on the test material. In the normalizing treatment, after the test material was heated to 1010° C. and was held for five hours, the test material was cooled in furnace to 200° C. or less at a cooling rate equivalent to air cooling with respect to the rotor used in the actual machine. In addition, in the tempering treatment, after the test material was heated to 720° C. and was held for nine hours, the test material was cooled in furnace to 200° C. or less. Thereafter, a heat treatment equivalent to the refining heat treatment with respect to the rotor used in the actual machine was performed. After the test material was heated to 950° C. and was held for nine hours, the test material was cooled in furnace to 200° C. or less at a cooling rate equivalent to oil cooling of an actual machine. Thereafter, a heat treatment equivalent the tempering step of the actual machine was performed. That is, after the test material was heated to a tempering temperature (PC) and was held for ten hours, the test material was cooled in furnace to 200° C. or less.

Here, four temperature conditions were set as the temperature T[° C.] in the tempering process. That is, four conditions of T=645 [° C.], 655[° C.], 665[° C.], and 675[° C.] were set.

(Material Test)

A test piece was processed from the test material and a material test was performed. When the heat treatment cycle was performed, with respect to 0.2% proof strength [MPa], tensile strength [MPa], elongation [%], contraction [%], an impact value [J/cm$^2$], and 50% FATT [° C.], in cases (center portions were assumed) in which the outer diameters were φ500 [mm], φ1000 [mm], and φ1500 [mm] and a case in which a surface layer was assumed, test were performed under four temperature conditions, and the test results are shown in Table 1 to Table 4 below.

TABLE 1

Tempering temperature: T = 645 [° C.]

|  | φ500 Center portion | φ1000 Center portion | φ1500 Center portion | Surface layer |
|---|---|---|---|---|
| 0.2% proof strength [MPa] | 837 | 856 | 849 | 849 |
| Tensile strength [MPa] | 965 | 986 | 991 | 977 |
| Elongation [%] | 16.0 | 14.4 | 13.8 | 17.2 |
| Contraction [%] | 59.0 | 51.0 | 45.2 | 66.4 |
| Impact value [J/cm$^2$] | 71 / 62 | 63 / 53 | 46 / 48 | 178 / 162 |
| 50% FATT [° C.] | 68 | 95 | 145 | −20 |
| Hardness [Hv] | 314 | 313 | 318 | 302 |

TABLE 2

Tempering temperature: T = 655 [° C.]

|  | φ500 Center portion | φ1000 Center portion | φ1500 Center portion | Surface layer |
|---|---|---|---|---|
| 0.2% proof strength [MPa] | 758 | 720 | 753 | 756 |
| Tensile strength [MPa] | 893 | 846 | 895 | 885 |
| Elongation [%] | 14.6 | 19.2 | 16.0 | 18.0 |
| Contraction [%] | 53.8 | 69.8 | 61.6 | 60.3 |
| Impact value [J/cm$^2$] | 191 / 168 | 66 / 165 | 74 / 99 | 222 / 197 |
| 50% FATT [° C.] | 20 | 35 | 60 | −55 |
| Hardness [Hv] | 281 | 282 | 282 | 283 |

TABLE 3

Tempering temperature: T = 665 [° C.]

|  | φ500 Center portion | φ1000 Center portion | φ1500 Center portion | Surface layer |
|---|---|---|---|---|
| 0.2% proof strength [MPa] | 737 | 737 | 713 | 709 |
| Tensile strength [MPa] | 867 | 874 | 848 | 840 |
| Elongation [%] | 20.6 | 17.4 | 17.0 | 21.2 |
| Contraction [%] | 70.8 | 66.4 | 61.6 | 70.8 |
| Impact value [J/cm$^2$] | 189 / 193 | 122 / 124 | 156 / 145 | 263 / 253 |
| 50% FATT [° C.] | 5 | 5 | 45 | −50 |
| Hardness [Hv] | 277 | 278 | 268 | 263 |

TABLE 4

Tempering temperature: T = 675 [° C.]

|  | φ500 Center portion | φ1000 Center portion | φ1500 Center portion | Surface layer |
|---|---|---|---|---|
| 0.2% proof strength [MPa] | 652 | 649 | 667 | 666 |
| Tensile strength [MPa] | 787 | 784 | 801 | 797 |
| Elongation [%] | 19.4 | 19.6 | 19.6 | 21.2 |
| Contraction [%] | 75.0 | 73.0 | 70.8 | 73.0 |
| Impact value [J/cm$^2$] | 277 / 262 | 266 / 233 | 189 / 181 | 288 / 284 |
| 50% FATT [° C.] | −25 | −5 | 10 | −85 |
| Hardness [Hv] | 247 | 246 | 257 | 255 |

From the above-described test results, in the above-described embodiments, the outer diameter dimension of the rotor base material 30A was set to φ1000 [mm] or less and tempering was performed in the temperature range of 630° C. or more such that the rotor base material 30A satisfied characteristics shown in Table 5 below.

TABLE 5

| 0.2% proof strength [MPa] | ≥638 |
|---|---|
| Tensile strength [MPa] | ≥785 |
| Elongation [%] | ≥15 |
| Contraction [%] | ≥40 |
| Impact value [J/cm$^2$] | ≥49.1 |
| 50% FATT [° C.] | <40 |

INDUSTRIAL APPLICABILITY

According to the method for producing a turbine rotor and the method for producing a turbine, it is possible to produce a turbine rotor having a sufficient high-temperature resistance as a high and low pressure integral type turbine rotor used in a small and medium-sized turbine.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE CHARACTER LIST

1: steam turbine
10: casing

20: adjustment valve
21: adjustment valve chamber
22: valve body
23: valve seat
24: steam chamber
30: turbine rotor
30A: rotor base material
31: rotor main body
32: disk
40: vane row
41: vane
50: blade row
51: blade
60: bearing portion
61: journal bearing device
62: thrust bearing device
O: rotation axis
S: steam
ST1: forming process
ST2: quenching process
ST3: tempering process
ST4: blade row installation process
ST5: casing installation process
ST6: vane row installation process

The invention claimed is:

1. A method for producing a turbine rotor, comprising:
forming a rotor base of an outer diameter of 500 mm to 1000 mm and the rotor base being made of a rotor base material comprising low-alloy steel that contains, in weight %:
    carbon of 0.20% to 0.35%,
    silicon of up to 0.35%,
    manganese of up to 1.00%,
    nickel of 0.50% to 1.50%,
    chromium of 2.00% to 2.50%,
    molybdenum of 0.90% to 1.50%, and
    vanadium of 0.20% to 0.30%;
heating the rotor base material, by a heating process before quenching, to a temperature range of 940° C. to 960° C.;
quenching the rotor base material, after the heating process, until a temperature drops below 200° C. at a cooling rate of at least 2.0° C./min; and
tempering the rotor base material, after the quenching, at a temperature range of 655° C. to 665° C., and under a condition that a tempering parameter P is in a range of 19700 to 19900, wherein P is defined by a Formula P=T (C+log(t)), where T is an absolute temperature measured in Kelvin, t is time measured in hours and t is set to 10, and C is a material constant, and C is set to 20.

2. A method for producing a turbine, comprising:
fixing a plurality of blade rows to a turbine rotor such that the plurality of blade rows is arranged in a direction of a rotation axis of the turbine rotor obtained by the method for producing the turbine rotor according to claim 1;
providing a casing that covers the turbine rotor such that the turbine rotor and the blade rows are rotatable relative to each other about the rotation axis; and
fixing a plurality of vane rows to the casing such that each of the plurality of vane rows is disposed alternately with the blade rows in the direction of the rotation axis.

* * * * *